March 29, 1932. W. B. ANDERSON 1,851,533
METAL TANK RECTIFIER
Filed Jan. 29, 1931 3 Sheets-Sheet 1
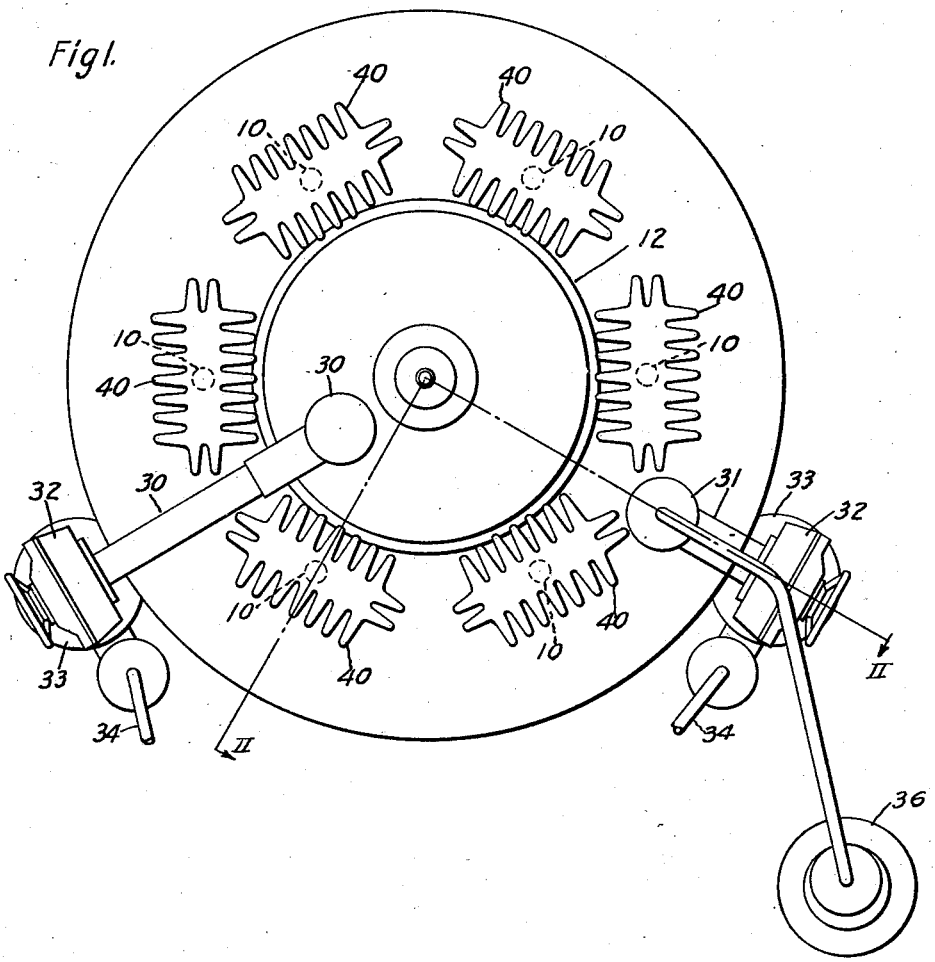
WITNESSES:
INVENTOR
William B. Anderson
BY
ATTORNEY

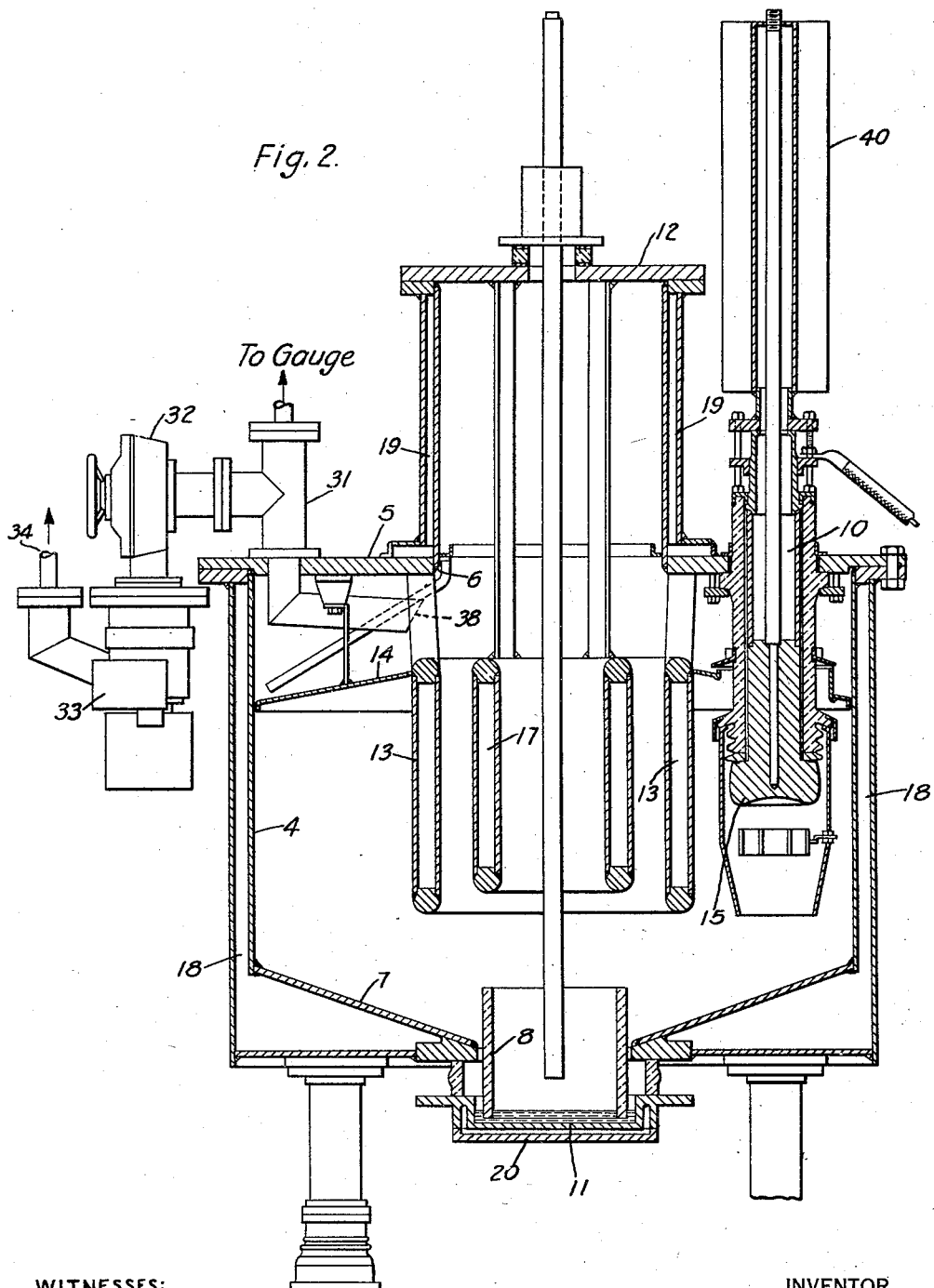

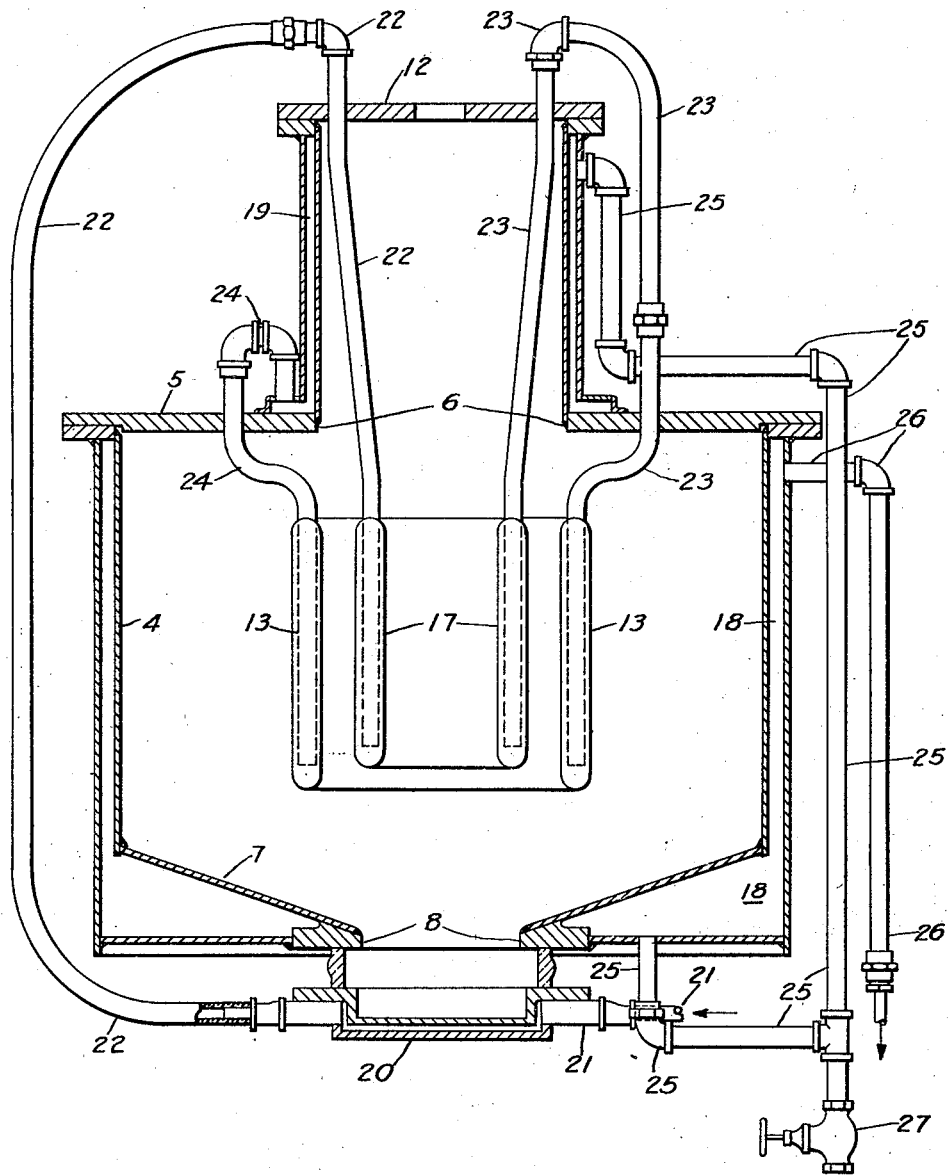

Patented Mar. 29, 1932

1,851,533

UNITED STATES PATENT OFFICE

WILLIAM B. ANDERSON, OF IRWIN, PENNSYLVANIA, ASSIGNOR TO WESTINGHOUSE ELECTRIC & MANUFACTURING COMPANY, A CORPORATION OF PENNSYLVANIA

METAL TANK RECTIFIER

Application filed January 29, 1931. Serial No. 511,975.

My invention relates to a new design of metal-tank, mercury-arc rectifier, which gives a much better performance than any large metal-tank, mercury-arc rectifier previously made. It is my belief that the improved operation which I have obtained is due practically altogether to a new combination of means for producing a vapor flow, within the rectifier, passing centrally upwardly in the main rectifier tank thence spreading out under the anode plate, and finally passing down, mainly as condensed liquid mercury, along the outer walls of the main rectifier tank, in combination with a superimposed condenser which becomes effective mainly at overloads, to provide adequate overload capacity at minimum expense.

With the foregoing and other objects in view, my invention consists in the constructional designs and combinations hereinafter described and claimed, and illustrated in the accompanying drawings, wherein Figure 1 is a simplified plan view of a rectifier embodying my invention, Fig. 2 is a vertical sectional view thereof, with the water connections omitted, the section plan being indicated by the line II—II in Fig. 1, and Fig. 3 is a vertical section view showing the water connections.

My invention relates to a rectifier of the type having an evacuated iron tank 4 constituting the main tank portion of the rectifier, said tank portion comprising a top anode plate 5 having a large central opening 6 therein, and said tank portion also having a bottom wall 7 having a large central opening 8 therein. A plurality of anodes 10 are insulatedly suspended within the main tank portion 4, around the central top opening 6, and the liquid-mercury cathode member 11 is insulatedly attached and hermetically sealed to the bottom of the main tank portion 4, around the opening 8 therein. An inverted cup-shaped condensing dome 12 projects above the top of the main tank portion 4 around said central top opening 6.

According to my invention, a tank, as above described, is provided with a cylindrical baffle 13 which is suspended centrally within the main tank portion and clear of both the top and bottom of the tank and clear of the anodes. Cooperating with said cylindrical baffle 13 is an annular baffle 14 which extends from the top of the cylindrical baffle substantially to the side walls of the main tank portion 4, said annular baffle sloping somewhat downwardly from the cylindrical baffle, and being above the bottoms 15 of the anodes.

A cooling means is provided for the main tank portion 4. Said cooling means consists principally of a double-walled construction of the cylindrical baffle 13, providing a hollow construction through which water is circulated, and one or more smaller cylindrically disposed coolers 17, through which water is also circulated. In addition, the main tank portion has the usual water jacket 18.

In like manner, cooling means are provided for the condensing dome 12. This means usually consists of a water jacket 19, although additional, or more elaborate, cooling means for cooling the condensing space in this dome 12, may be embodied, if desired or necessary.

The cathode member 12 is provided with the usual water jacket 20.

Referring to Fig. 3, it will be seen that water is let first into the cathode jacket 20, through an inlet pipe 21, thence through a pipe 22 to the inner cylindrical cooler 17, thence through a pipe 23 to the outer cylindrical cooler or baffle 13, thence through a pipe 24, to the dome jacket 19, thence through a pipe 25, to the tank jacket 18, from which the water is expelled, through an outlet pipe 26. At any convenient part of the structure, as in the lowest part of the pipe 25, a drain outlet connection may be provided, including a water valve 27, for the purpose of draining water from the circulating system. While I have shown the various cooling media connected in series, it will be understood that each cooling means may be provided with a separate source of water supply, which may be controlled in a suitable manner.

My present theory of the manner in which the above-described construction produces the superior results which have been obtained therefrom may be briefly stated, as follows. The mercury blast or vapor rises from the cathode and the major portion of its passes through the ring coolers 17 and 13, where it is either partially condensed or reduced in temperature. The remaining portion that is not condensed passes on through the coolers and goes either into the dome 12 or into the annular space between the anode cover plate 5 and the annular baffle 14.

I have made an exhaustive investigation, utilizing a special tank construction with many observation windows therein, and carefully measuring the water flow and temperature changes in each of the water connections, in order to determine just what takes place within the rectifier. Approximately 40% of the rectifier losses which are removed by means of the cooling water is removed by the ring coolers 17 and 13. At light loads, the rectifier losses which are removed by the dome water jacket are negligible. As the load increases, the losses which are removed by the dome water jacket increase, until, at full load, about 10% of the losses which are dissipated by the entire water system are taken out by means of the dome water jacket.

I have also observed that, at increasingly heavy loads, there is an increase in the size, number and speed of the condensed mercury drops which blow up into the condensing dome 12. Likewise, the height to which the vapor cloud and drops, which are projected above the ring coolers, are extended increases with the load.

My conclusion is, therefore, that at light loads, the mercury vapor flow is up through the cylindrical baffle 13 and thence upwardly over the annular baffle 14. Most of the mercury vapor is condensed by the time it reaches the outer edge of the annular baffle 14, but any that is not condensed passes downward along the outer walls of the tank 4, where it is quickly condensed into liquid mercury. As the load increases, some of the mercury vapor passes up into the condensing dome, until, at full load, about one-tenth of the losses are absorbed in this dome. However, for sudden overloads, the dome becomes particularly effective, in a rectifier designed for the spreading-out vapor flow just described, because it permits the major portion of the excess mercury vapor and liquid mercury drops, which are produced by the increasing current, to fly directly up into the dome 12, which thus furnishes the necessary additional condensing surface, and provides a reserve rectifier-capacity at a small cost per kilowatt. The result is a rectifier which operates remarkably well with both ordinary loads and at heavy overloads, occupying but a small space, and being singularly free from the back-firing troubles which have so marred the performance of previous rectifiers.

I have also observed that the blast of mercury vapor entering the dome has an action similar to that which occurs in a mercury vapor pump, carrying the non-condensible gases up into the dome. My rectifier is provided with two evacuating pumping means, one being connected at the top of the condensing dome, as indicated at 30, and the other being connected to the anode plate, as indicated at 31. Each pumping connection includes a valve 32 and a mercury vapor pump 33, which delivers the pumped gases to an outlet connection 34 which may go to an interstage reservoir (not shown), and thence to a mechanical pump (not shown) as is usual in metal-tank rectifiers. One or both of the pumping connections may be provided with a vacuum gage 36.

I have found that a considerable difference of pressure exists at the two pumping connections. In service, only the top pumping connection from the top of the condensing dome is usually needed. It is very convenient, however, particularly during the initial treating-out period, to have both pumping connections. The lower pumping connection, that is, the one at the anode plate 5, is preferably provided with an intake pipe 38 which is carried over to the interior portion of the tank, as indicated in Fig. 2.

It is desirable, in designing the vapor-flow paths within the rectifier, to keep the cross sectional area of this path substantially the same, until the vapor is practically all condensed. If anything, it is desirable to have an increasing area as the vapor progresses, in order to allow for its expansion. To this end, therefore, in order that there may not be any restriction in the vapor flow path as the vapor expands out into the space underneath the anode plate, it is desirable that the vertical distance between the annular baffle and the anode plate shall be at least of the order of one-half of the radius of the cylindrical baffle.

It will be noted that the annular baffle 14, besides performing the functions hereinabove noted, with respect to the vapor-flow paths, also serves to prevent the droppage of liquid mercury into the space in the vicinity of the anodes, thereby assisting in the prevention of backfiring.

In addition to the water cooling system hereinabove described, it will be understood that some suitable cooling means will be provided for the anodes. This means may take the shape of a plurality of air-cooled anode radiators 40.

In the foregoing specification, and in the appended claims, when I use the term "cylindrical", I do not mean that the side walls of the elements so defined must be exactly parallel or that the cross section must be exactly circular. I utilize the term in a loose popular sense or approximation, rather than in the strict mathematical sense. In like manner, I intend, by the term, "cylindrically disposed" to include such constructions as helically wound pipe, with the coils of the helix either wound tightly together, in contact with each other, or in an open helix formation.

It will be understood, also, that my invention is not limited to the precise form of embodiment shown in the drawings. I desire, therefore, that the appended claims be accorded the broadest interpretation consistent with their language and the prior art.

I claim as my invention:

1. An evacuated metal-tank mercury-arc rectifier having a main tank portion having openings in the centers of the top and the bottom, anodes insulatedly suspended therewithin, around the central top opening, a liquid-mercury cathode member insulatedly attached and hermetically sealed to the bottom of the main tank portion, around the opening therein, an inverted cup-shaped condensing dome projecting above the top of the main tank portion and hermetically sealed thereto, around said central top opening, a cylindrical baffle supported centrally within the main tank portion and clear of both the top and the bottom of the tank, and clear of the anodes and the cathode, an annular baffle extending from the top of said cylindrical baffle substantially to the side walls of said main tank portion, said annular baffle sloping somewhat downwardly from said cylindrical baffle and means above the bottoms of the anodes, and cooling means for said main tank portion and for said condensing dome, said cooling means being so disposed as to admit of a substantially unrestricted vapor flow up through the cylindrical baffle and out over the annular baffle.

2. The invention as defined in claim 1, characterized by the fact that the vertical distance between the top of the cylindrical baffle and the top of the main tank portion is at least of the order of one half of the radius of the cylindrical baffle.

3. The invention as defined in claim 1, characterized by said main-tank cooling means comprising means for conducting a cooling medium into contact with said cylindrical baffle.

4. The invention as defined in claim 1, characterized by said main-tank cooling means comprising means for conducting a cooling medium into contact with said cylindrical baffle, and a second, smaller, similarly cooled cylindrically disposed cooling member within said cylindrical baffle.

5. The invention as defined in claim 1, characterized by said main-tank cooling means comprising a smaller, cylindrically disposed member within said cylindrical baffle, and means for conducting a cooling medium into contact with the walls of said smaller, cylindrically disposed member.

6. The invention as defined in claim 1, characterized by an evacuating pumping means having a connection to the interior of the evacuated space within the rectifier, said connection being at a point near the top of the condensing dome.

7. The invention as defined in claim 1, characterized by an evacuating pumping means, having a connection to the interior of the evacuated space within the rectifier, said connection being at a point near the top of the condensing dome, and having a second connection to the interior of the evacuated space within the rectifier, said last-mentioned connection being at a point near the top of the main tank portion.

8. The invention as defined in claim 1, characterized by an evacuating pumping means having a connection to the interior of the evacuated space within the rectifier, said connection being at a point near the top of the condensing dome, and an auxiliary evacuating pumping means having a connection to the interior of the evacuated space within the rectifier, said last-mentioned connection being at a point near the top of the main tank portion.

9. An evacuated metal-tank mercury-arc rectifier having a main tank portion having openings in the centers of the top and the bottom, a plurality of anodes insulatedly suspended therewithin, around the central top opening, a liquid-mercury cathode member insulatedly attached and hermetically sealed to the bottom of the main tank portion, around the opening therein, an inverted cup-shaped condensing dome projecting above the top of the main tank portion and hermetically sealed thereto, around said central top opening, cooling means for said main tank portion and for said condensing dome, an evacuating pumping means having a connection to the interior of the evacuated space within the rectifier, said connection being at a point near the top of the condensing dome, and an auxiliary evacuating pumping means having a connection to the interior of the evacuated space within the rectifier, said last-mentioned connection being at a point near the top of the main tank portion.

10. An evacuated metal-tank mercury-arc rectifier having a main tank portion having openings in the centers of the top and the bottom, a plurality of anodes insulatedly suspended therewithin, around the central top opening, a liquid-mercury cathode member insulated attached and hermetically sealed to the bottom of the main tank portion, around the opening therein, an inverted cup-shaped condensing dome projecting above the top of the main tank portion and hermetically sealed thereto, around said central top opening, cooling means for said main tank portion and for said condensing dome, said cooling means comprising a cylindrically disposed cooler supported centrally within the main tank portion and clear of both the top and the bottom of the tank and the cathode, and clear of the anodes, an annular baffle extending from near the top of said cylindrically disposed cooler substantially to the side walls of said main tank portion, said annular baffle sloping somewhat downwardly from said cylindrically disposed cooler and being above the bottoms of the anodes, and an evacuating pumping means for the rectifier.

In testimony whereof, I have hereunto subscribed my name this 23rd day of December, 1930.

WILLIAM B. ANDERSON.